INVENTORS
RICHARD G. STONER
BRUCE D. CAULKINS

WILSON, SETTLE, BATCHELDER
ATT'YS.   & CRAIG.

INVENTORS
RICHARD G. STONER
BRUCE D. CAULKINS

WILSON, SETTLE, BATCHELDER
ATT'YS. & CRAIG.

United States Patent Office 3,424,222
Patented Jan. 28, 1969

3,424,222
SEAL STRUCTURE
Richard G. Stoner, 806 Washington Road, Grosse Pointe, Mich. 48236, and Bruce D. Caulkins, 806 Shore Club Drive, St. Clair Shores, Mich. 48080
Filed Oct. 31, 1966, Ser. No. 590,844
U.S. Cl. 160—40      8 Claims
Int. Cl. E06b 7/23, 3/48; E05d 15/38

ABSTRACT OF THE DISCLOSURE

A seal structure is provided for use as a door seal in refrigerated units, such as trucks, trailers, and the like. The seal is utilized with a closure assembly comprising a fixed frame member defining an opening. A closure member is slidably associated with the frame member. The seal structure is fixed to either the fixed frame member or the closure member and is engageable with the other member. The seal structure has a collapsible portion and a contacting portion which normally engages the other of the members. Vacuum means are connected to the collapsible portion and adapted to temporarily collapse the seal structure and allow unrestricted movement of the closure member with respect to the fixed frame member. The seal encloses a chamber in which are provided baffle means which provide an even collapse of the chamber when a vacuum is applied to the chamber. An open cell structure may be provided within the chamber for normally maintaining the chamber in an expanded condition. A casing surrounds the major portion of the chamber to guide the contacting portion along a predetermined path when the chamber is collapsed.

Background of the invention

The use of overhead type sectionalized doors in large trucks and trailers eliminates the need for allowing space between the loading or unloading docks and the truck body since the doors need not swing outwardly from the truck body or trailer. When using overhead type doors in trucks or trailers, which are refrigerated for transporting perishable items, satisfactory seals must be provided between the adjacent sections of the door and between the door and the fixed frame surrounding the door.

Since conventional overhead type doors for trucks and trailers usually are mounted in tracks to be guided between the raised and lowered positions, freedom of movement with respect to any seal structure employed at the door opening is required in order to enable the door to be raised or lowered without any dragging effect from the seal.

The recent trend in sealing the opening or space between the movable closure and the fixed frame member has been to employ an inflatable seal which is disposed adjacent the opening and is adapted to be expanded into contacting engagement with the fixed frame and the surface of the door by pressurizing the inflatable seal. One of the main disadvantages of this type of seal, particularly when used in conjunction with the refrigerated truck or trailer, is that if a leak develops in the inflatable seal member during transportation the seal will collapse, thereby opening the space between the fixed frame and the movable closure. This may result in destruction of an entire load which may be required to be refrigerated at all times.

The primary object of the present invention is to provide a new and improved door seal which is normally in contacting engagement with the door and the supporting frame.

Another object is to provide an improved door seal which can be quickly and efficiently disengaged from the door.

A further object is to provide an improved door seal which is in contacting engagement with the door in its relaxed position.

Still another object is to provide an improved sectionalized door having an effective seal between the adjacent ends of the sections and the door and fixed frame when the door is in the closed position.

A still further object is to provide an improved door which is effectively sealed in a closed position and is capable of being moved between the closed and open position with no drag between the movable door and the fixed frame member.

Generally speaking, the door includes a plurality of sections which are hinged together and provided with a collapsible cushioning material carried by the adjacent ends of each of the fixed constructions which, when the door is in the closed position, effectively seals the space between the adjacent sections.

The sectionalized door is mounted on a non-metallic track fixed to the frame member surrounding the opening to be closed with the door having non-metallic guide means including a roller slideably received in the track and rotatable on a pin which is rotatably journaled on the sections.

A seal member is mounted on the fixed frame and includes a sealed chamber or enclosure having an impervious portion normally engaging the movable door to seal the space between the frame and the door. The sealed chamber or enclosure has means for normally maintaining the chamber in an expanded condition with the impervious portion in contacting engagement with the surface of the door and is capable of being collapsed by applying a vacuum within the sealed chamber to move the impervious portion out of contacting engagement with the door.

Other objects and features of the invention will become readily apparent with reference to the following specifications taken in conjunction with the accompanying drawings.

Figure 1:
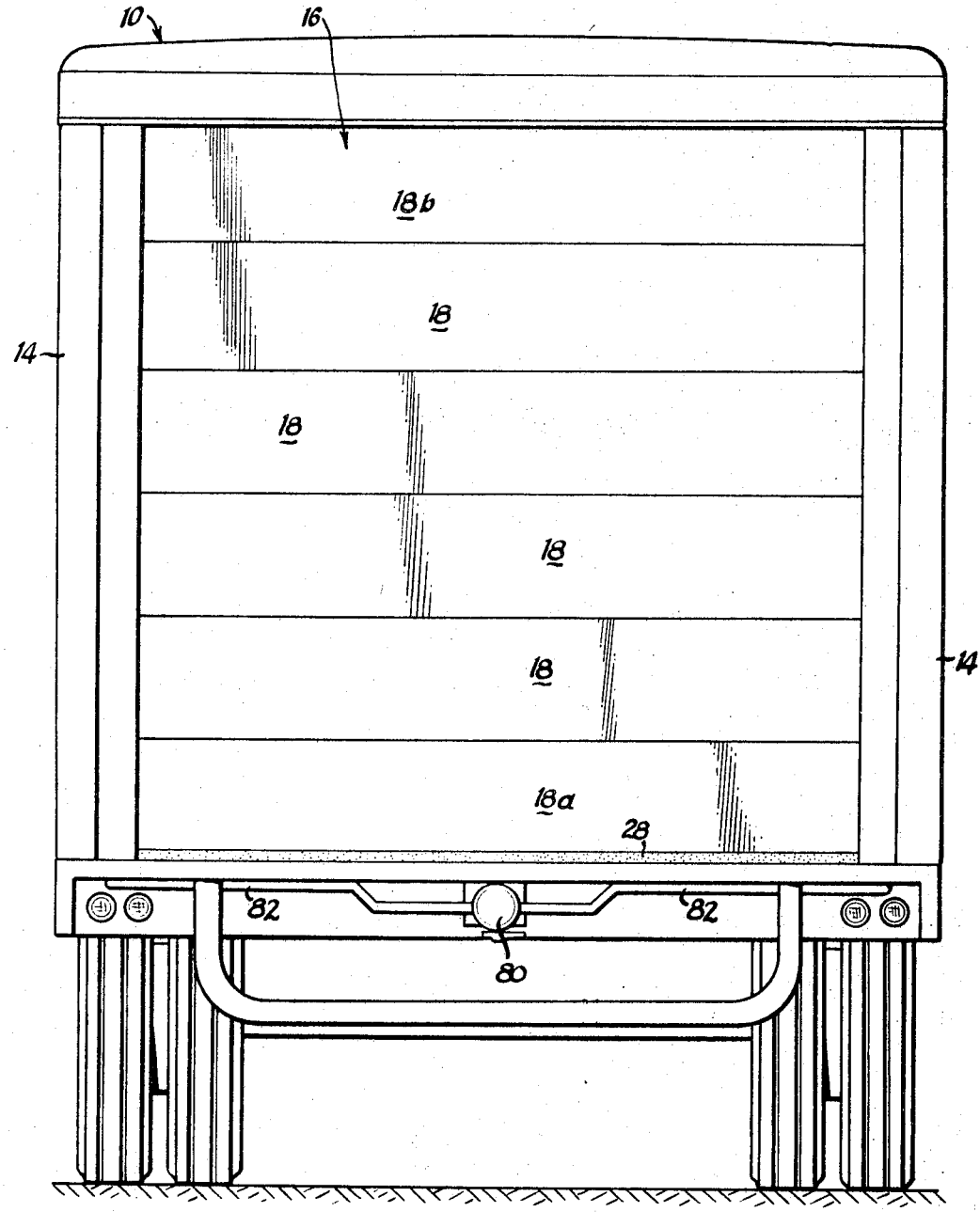
FIGURE 1 is a rear view of the truck or trailer having a door and seal of the present invention.
Figure 2:
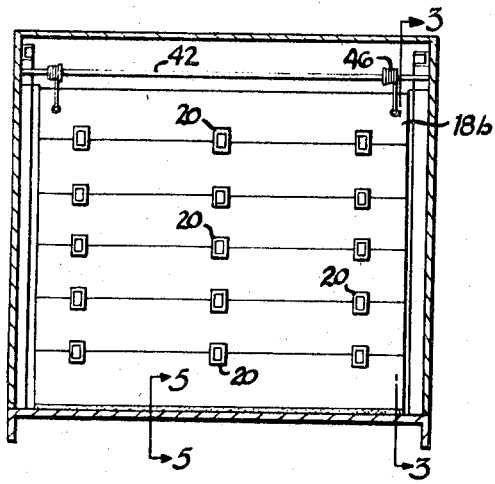
FIGURE 2 is a vertical sectional view of the truck or trailer body showing the inside of the door in the closed position.

Referring particularly now to FIGURE 1 of the drawings, there is shown a truck or trailer body designated generally by the reference numeral 10 having walls 12. Two vertically disposed corner posts 14 form part of the frame of the body 10 and further serve to define the size of the door openings which may be closed by an overhead door 16. The door 16 includes a plurality of horizontally extending segments or sections 18 which are hinged to each other by conventional hinges 20 carried by the inner segments of the door (FIGURE 2).

Each of the sections intermediate the top and bottom sections 18a, 18b, are identical in construction and include a pair of spaced plates 22 having an insulating material 24 disposed between the respective inner surface of the spaced plates. The plates 22 may be fabricated from metal, wood, plastic as desired. The insulating material is preferably of a closed cell of polyurethane material or any other material having low thermal conductivity and low density. The upper and lower ends of each section 18 are sealed with an impervious collapsible member 26 which has a tapered portion 28 extending outwardly of the section, for a purpose to be described later. The members 26 are preferably formed of a spongy material, such as a closed-cell synthetic rubber, which is capable of preventing heat transfer from the enclosed portion of the truck body and the ambient atmosphere.

Figure 4:
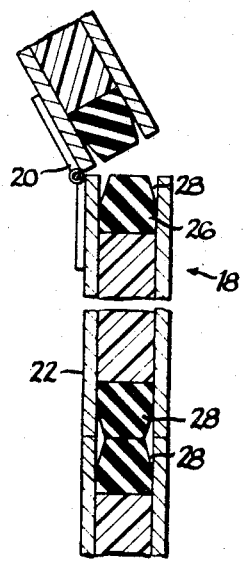
FIGURE 4 is a fragmentary enlarged sectional view of the sectionalized door.
Figure 3:
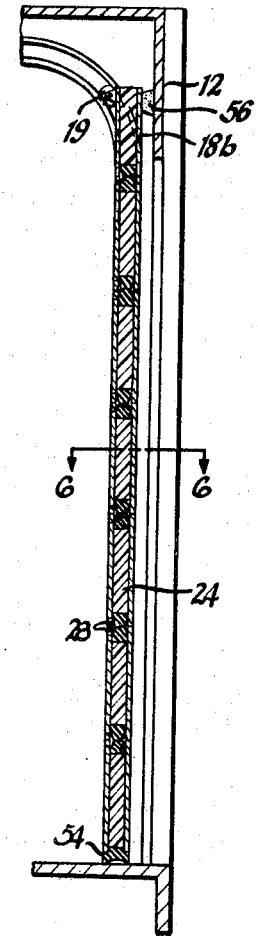
FIGURE 3 is a vertical section taken generally along lines 3—3 of FIGURE 2.

As can readily be seen with reference to FIGURE 4 of the drawings, the impervious members 26 will form an effective seal between the adjacent segments of the door and the tapered or inclined portion 28 will prevent an unsightly bulge when the door is in the closed position. The side openings between the spaced plates 22 are closed by a plastic member 30 for a purpose to be described later.

According to one aspect of the invention, the door 16 is guided relative to the body 10 by a plurality of plastic rotatable rollers 32 (FIGURE 6) rotatably journaled on a plastic pin 34 which is journaled in an opening in each of the plastic members 30. The rollers are adapted to be received in an elongated opening 36 formed in a plastic member or track 38 fixedly secured to the side wall 12 of the body by screws 40. By using a compatible plastic for the T-shaped member 30, roller 32, pin 34 and track 38, the support assembly will provide a three point rotation between the door sections and the track 38.

Raising and lowering of the door 16 may be assisted by the provision of a spring bias rod 42 which is rotatably journaled in the header panel of the truck body and has one end of a pair of spaced cables 44 fixedly secured to a drum 46 with the opposite ends of the cables 44 secured to the door. The door 16 may alternately be moved by means of a lateral tension spring at a position paralleling the header and above the door.

Figure 5:
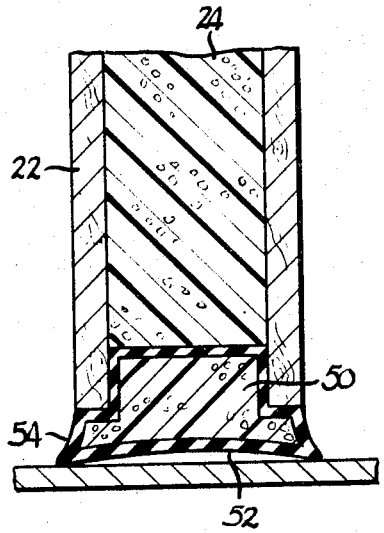
FIGURE 5 is a vertical section taken generally along lines 5—5 of FIGURE 3.
Figure 7:
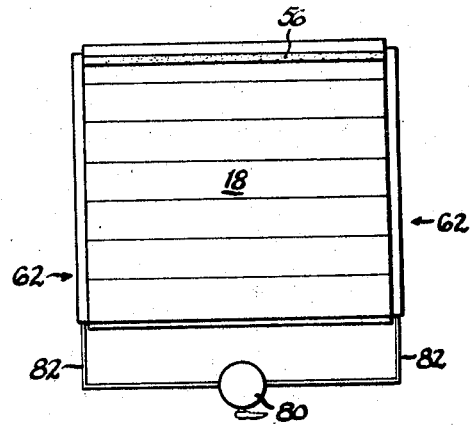
FIGURE 7 is a view showing the door section and seal structure.

As shown in FIGURE 5, the lower edge of the lower segment 18a of the door 16 is provided with a sealed member 50 which is adapted to engage the upper surface of the floor of the body 10. The lower door seal 50 comprises a flexible impervious material which is capable of providing an air tight seal between the outside and the inside of the body 10. In order to effect a good seal between the floor of the body 10 and the door, the lower portion 52 of the lower seal 50 is in the form of a concave surface and the side surfaces are flared outwardly from the lower edge of the plates 22. Therefore, as the door is forced downwardly into engagement with the lower or bottom wall of the body 10 the concave surface 52 and the surfaces 54 will allow the door seal to expand horizontally thereby effecting a better seal between the lower edge of the door and the body 10.

The upper caster 19 of the top section 18b is offset to force the top of the top panel section 18b toward the rear and against the seal 56 which is adhered to the header panel. The seal 56 is formed of a material similar to the seals 26 and 50.

As was indicated above, the door 16 is preferably spaced slightly from the side walls of the body 10 so that the door may readily be moved between the open and closed positions without any undue frictional drag caused by the door being in sliding contact with a portion of the body. However, in order to attain this freedom of movement of the door with respect to the sides of the body, a space or opening must be provided between the fixed frame forming the door opening and the door structure. According to the invention, an improved seal structure 60 is employed to seal the vertical side edges of the door and the fixed frame of the body. Since the two seal structures 60 are identical in construction, only one will be described in detail.

The seal structure 60 includes a chamber or enclosure 62 formed by an air tight solid skin flexible wall 64 which has an impervious contacting portion 66 carried adjacent one surface thereof which is adapted to move into and out of engagement with the outer surface of the door 16 and the track 38. The chamber 62 includes means for normally maintaining the chamber in an expanded condition which in the illustrated embodiment is shown as an open celled spongy material 68. The open celled structure will allow a fluid, such as air, to pass freely throughout the enclosed chamber, for a purpose to be described later.

The chamber or cell 62 is received and maintained in a vertically extending channel 70 which is fixedly secured to the inner surface of the end post 14 and the vertically extending side wall 12 of the body 10. The chamber is further provided with a vertically extending perforated plate 72 and a vertically extending plate 74 next to the inner surface of the wall 64 adjacent the contacting impervious portion 66. Each of the chambers 62 is in open communication via conduits 82 with a vacuum pump 80 or other suitable vacuum source carried by the truck body. The vacuum pump 80 may be hand actuated or power actuated in a manner well known in the art.

Figure 6:
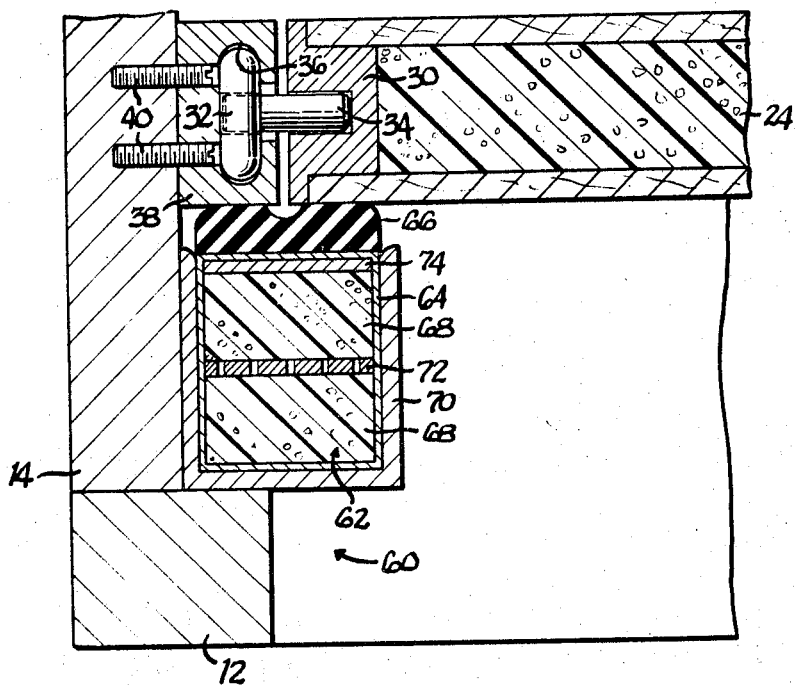
FIGURE 6 is a horizontal sectional view taken along lines 6—6 of FIGURE 3.

In operation, the seal structure is normally in the expanded condition, as shown in FIGURE 6, with the contacting portion 66 in contacting engagement with the door 16 to seal the vertically extending opening between the door and the fixed frame formed by the body 10. When it is desired to raise or lower the door the vacuum source is actuated to produce a vacuum in the chambers 62 thereby collapsing the chamber to move the containing portion 66 out of engagement with the outer surface of the door. This will allow unrestricted movement of the door with respect to the fixed frame during opening and closing thereof. The vertically extending member 72 and the channel 70 will give an even collapse of the chamber or cell 62 while vacuum is being applied.

Whenever it is desired to reseal the chamber, all that is necessary is to release the vacuum applied to the chamber and the open celled material 68 will expand the chamber to the position shown in FIGURE 6 to move the contacting portion into a sealing engagement with the door.

As can readily be appreciated, the improved seal structure of the present invention provides an effective way of sealing the spaced opening between a movable closure and a fixed member since any leak developing in the wall or member 64 will not effect the sealing capabilities of the seal structure. Even if a leak develops in the chamber or cell 62, the open celled material within the chamber will still exert the mechanical force necessary to produce a good seal between the door and the fixed frame. Additionally, a leak will not cause the cells to be inoperative when the vacuum is applied because the air can be evacuated from the cells faster than it can enter through any normal sized opening in the cell.

Although the material for maintaining the chamber 62 in its expanded condition has been shown to be an open celled structure, it is readily apparent that various other means may be utilized without departing from the spirit of the invention. For example, the chamber may be maintained in expanded condition by use of springs properly positioned within the chamber to maintain it in expanded condition and yet be capable of being contracted by a vacuum pressure applied to the chamber to move the contacting portion 66 out of engagement with the moveable closure.

While a preferred embodiment of the invention has been shown and described, it will be understood that various changes and modifications may be made without departing from the spirit of the invention which is defined by the following claims.

We claim:

1. A seal structure for sealing the space between a fixed frame member forming an opening and a movable closure member slidably associated therewith comprising a chamber carried by one of said members and having means for normally maintaining said chamber in an expanded condition, an impervious contacting portion normally engaging the other of said members, vacuum means connected to said chamber to collapse said chamber and allow substantially unrestricted movement between the closure member and the fixed frame member, and baffle means disposed within the chamber to provide an even collapse of the chamber when said vacuum is applied to said chamber.

2. A seal structure as defined in claim 1, wherein said means within said chamber includes an open cell structure which is adapted to be collapsed by applying vacuum to said chamber.

3. A sealing structure as defined in claim 1, further including a casing surrounding the major portion of said chamber to guide said contacting portion along a predetermined path when said chamber is collapsed.

4. A closure assembly comprising a fixed frame member defining an opening, a closure member slidably associated with said fixed frame member and at least one seal structure fixed to one of said members and engageable with the other of said members, said seal structure having a collapsible portion and a contacting portion normally engaging the other of said members, vacuum means connected to said collapsible portion and adapted to temporarily collapse said seal structure and allow unrestricted movement of said closure member with respect to said fixed frame member, and a rigid member fixedly secured to one of said members and enclosing a major portion of said collapsible member to guide said contacting portion along a predetermined path when vacuum is applied to said collapsible portion.

5. A closure assembly as defined in claim 4, wherein said closure member includes a plurality of horizontally articulated sections and non-metallic track fixedly secured adjacent the side portions of the fixed frame forming the opening, each of said sections including a non-metallic portion adjacent each of said tracks and having a non-metallic pin rotatably received therein and non-metallic rollers rotatably journaled on each of said pins and adapted to be received in said track, said non-metallic materials comprising a compatible self lubricating plastic to provide a three point rotation between said fixed frame and each of said articulated sections.

6. A closure assembly as defined in claim 4, wherein said collapsible member includes a chamber having means for mechanically maintaining said chamber in an expanded condition and adapted to be collapsed when vacuum is applied to said chamber.

7. A closure assembly as defined in claim 4, wherein said closure member includes a plurality of horizontally articulated sections guided for movement between both the open and closed position in tracks carried by said frame member, and a second seal structure with said seal structures secured to said frame member adjacent each of said tracks with said contacting portions engaging said track and said door when said collapsible portion is expanded.

8. A closure assembly as defined in claim 7, wherein at least one of said upper and lower edges of said articulated sections include a collapsible sealing member having a tapered portion with said sealing members being in contacting engagement with the adjacent section when the door is in the closed position.

References Cited

UNITED STATES PATENTS

| | | | |
|---|---|---|---|
| 2,855,989 | 10/1958 | Pritchard | 160—40 |
| 2,908,948 | 10/1959 | Jones | 49—303 |
| 3,118,702 | 1/1964 | Kale et al. | 160—201 |

DAVID J. WILLIAMOWSKY, *Primary Examiner.*

J. KARL BELL, *Assistant Examiner.*

U.S. Cl. X.R.

49—477; 160—201